US012088037B2

(12) United States Patent
Hsiao et al.

(10) Patent No.: US 12,088,037 B2
(45) Date of Patent: Sep. 10, 2024

(54) CABLE END CONNECTOR

(71) Applicant: BIZLINK INTERNATIONAL CORPORATION, New Taipei (TW)

(72) Inventors: Hsin-Tuan Hsiao, New Taipei (TW); Jui-Hung Chien, New Taipei (TW)

(73) Assignee: BIZLINK INTERNATIONAL CORPORATION, New Taipei (TW)

(*) Notice: Subject to any disclaimer, the term of this patent is extended or adjusted under 35 U.S.C. 154(b) by 135 days.

(21) Appl. No.: 17/890,440

(22) Filed: Aug. 18, 2022

(65) Prior Publication Data
US 2022/0393385 A1 Dec. 8, 2022

Related U.S. Application Data

(63) Continuation-in-part of application No. 17/099,882, filed on Nov. 17, 2020, now Pat. No. 11,454,774.

(51) Int. Cl.
*H04B 10/00* (2013.01)
*H01R 13/502* (2006.01)
*H01R 13/66* (2006.01)

(52) U.S. Cl.
CPC ......... *H01R 13/502* (2013.01); *H01R 13/665* (2013.01)

(58) Field of Classification Search
CPC .. H01R 13/502; H01R 13/665; H01R 12/721; G02B 6/4269
See application file for complete search history.

(56) References Cited

U.S. PATENT DOCUMENTS

| | | | | |
|---|---|---|---|---|
| 10,104,760 | B1* | 10/2018 | Briant | G02B 6/4284 |
| 11,360,276 | B1* | 6/2022 | Blackburn | G02B 6/3897 |
| 11,374,363 | B2* | 6/2022 | Rita | H01R 13/6691 |
| 11,415,764 | B2* | 8/2022 | Kubo | G02B 6/4257 |
| 11,454,774 | B2* | 9/2022 | Hsiao | H01R 13/66 |
| 2015/0185427 | A1* | 7/2015 | Arao | G02B 6/4269 29/829 |
| 2016/0109670 | A1* | 4/2016 | Huang | G02B 6/4272 361/707 |
| 2016/0246019 | A1* | 8/2016 | Ishii | G02B 6/4246 |
| 2017/0133777 | A1* | 5/2017 | Little | H01R 12/721 |
| 2017/0194751 | A1* | 7/2017 | Little | H01L 23/467 |
| 2018/0009072 | A1* | 1/2018 | Kittel | H01L 21/4882 |
| 2018/0034211 | A1* | 2/2018 | Little | H01R 13/6581 |
| 2018/0338387 | A1* | 11/2018 | Park | G02B 6/4284 |
| 2019/0271818 | A1* | 9/2019 | Cabessa | H05K 1/0206 |
| 2019/0310435 | A1* | 10/2019 | Akieda | H05K 1/0274 |

(Continued)

*Primary Examiner* — Agustin Bello
(74) *Attorney, Agent, or Firm* — RABIN & BERDO, P.C.

(57) ABSTRACT

A connector has a case, a circuit board, a thermal diffusing unit, and a first heat sink. The circuit board is mounted in the case and has a heating source. The thermal diffusing unit abuts the inner surface of the case and the heating source of the circuit board. A heat transfer coefficient of the thermal diffusing unit is larger than a heat transfer coefficient of the case. The first heat sink abuts the thermal diffusing unit and is exposed from the case. A heat transfer coefficient of the first heat sink is larger than the heat transfer coefficient of the case. By the first heat sink abutting the thermal diffusing unit and exposed from the case, and the heat transfer coefficients of both the thermal diffusing unit and the first heat sink being larger than that of the case, the heat dissipation efficiency is improved.

17 Claims, 9 Drawing Sheets

(56) References Cited

U.S. PATENT DOCUMENTS

| | | | | |
|---|---|---|---|---|
| 2019/0394904 | A1* | 12/2019 | Lee | H01R 13/502 |
| 2020/0041729 | A1* | 2/2020 | Moriyama | G02B 6/3814 |
| 2020/0112373 | A1* | 4/2020 | Lai | H04B 10/40 |
| 2020/0221607 | A1* | 7/2020 | Bucher | H01R 12/716 |
| 2020/0285006 | A1* | 9/2020 | Matsui | H05K 7/20145 |
| 2020/0326494 | A1* | 10/2020 | Ishii | G02B 6/4269 |
| 2020/0333543 | A1* | 10/2020 | Oki | H04B 10/40 |
| 2021/0072473 | A1* | 3/2021 | Wall, Jr. | H05K 1/0274 |
| 2021/0103108 | A1* | 4/2021 | Wall, Jr. | G02B 6/4261 |
| 2021/0105025 | A1* | 4/2021 | Wall, Jr. | H04B 1/3827 |
| 2021/0120701 | A1* | 4/2021 | Chen | G02B 6/4269 |
| 2021/0176874 | A1* | 6/2021 | Ishii | G02B 6/4246 |
| 2021/0247577 | A1* | 8/2021 | Hsiao | H05K 7/2039 |
| 2022/0221667 | A1* | 7/2022 | Yao | G02B 6/4269 |
| 2022/0393385 | A1* | 12/2022 | Hsiao | G02B 6/4269 |

* cited by examiner

CABLE END CONNECTOR

CROSS-REFERENCE TO RELATED APPLICATION

This application is a continuation-in-part of U.S. patent application Ser. No. 17/099,882, filed on Nov. 17, 2020 and is based upon and claims the benefit of priority of the prior Taiwanese Patent Application No. 109201352, filed on Feb. 7, 2020. The entirety of the above-mentioned patent application is hereby incorporated by reference herein and made a part of this specification.

BACKGROUND OF THE INVENTION

1. Field of the Invention

The present invention relates to an electronic device with a cooling module, especially to a cable end connector.

2. Description of the Prior Arts

Due to the fast development of technologies such as 5G, AI, edge computing, TOT, etc., high-speed transmission for data is critical, and such transmission relies on specialized cables such as AOC (Active Optical Cable) or AEC (Active Ethernet Cable). However, during the transmission via the abovementioned specialized cables, the optical module or the IC generates high heat, which impacts the transmission speed. Therefore, the heat must be dissipated to ensure the performance.

A conventional method for cooling the optical module or the IC is applying a thermal paste or a thermal conductive sheet to the optical module or the IC, and making the thermal paste or the thermal conductive sheet contact a metal case to allow the optical module or the IC to transmit heat to the case to be cooled down.

Nevertheless, since the case must withstand external forces, the case must be made of a material having sufficient rigidity, which will lead to insufficient thermal conductivity of the material. Therefore, when the optical module or the IC transmits heat to the case, the heat can only be transmitted to an area of the cause, i.e., where the thermal paste or the thermal conductive sheet contacts the case, but cannot be transmitted to other areas of the case through insufficient thermal conductivity of the case's own material. Eventually, due to the small heat transmission area, the heat dissipation efficiency is low.

To sum up, how to meet the heat dissipation requirements for high-speed transmission under standard specifications has become a major issue in the field of transmission cable technology.

To overcome the shortcomings, the present invention provides a cable end connector to mitigate or obviate the aforementioned problems.

SUMMARY OF THE INVENTION

The main objective of the present invention is to provide a cable end connector that can achieve a larger heat conducting area through a thermal diffusing unit, so the heat dissipation efficiency is higher. Besides, the heating source can further dissipate heat through the first heat fin exposed out of the case, so the heat dissipation performance can be further improved.

A cable end connector has a case, a circuit board, and a thermal diffusing unit. The case has an upper shell and a lower shell. The upper shell is secured with the lower shell and forms an accommodating space therebetween. The circuit board has a heating source secured with the circuit board. At least a part of the circuit board is disposed in the accommodating space and at least a portion of the circuit board is disposed outside of the accommodating space. The thermal diffusing unit is disposed in the accommodating space and is thermally connected to the heating source and the upper shell. An area of the thermal diffusing unit thermally connected to the upper shell is bigger than an area of the thermal diffusing unit thermally connected to the heating source.

With the thermal diffusing unit disposed in the accommodating space and thermally connected to the heating source and the upper shell, and an area of the thermal diffusing unit thermally connected to the upper shell being bigger than an area of the thermal diffusing unit thermally connected to the heating source, the thermal diffusing unit is allowed to transmit heat from a small area to a big area, thereby enlarging the heat conducting area of the heating source and improving the heat dissipation efficiency.

In addition, with the first heat sink abutting the thermal diffusing unit and being exposed from the case, and the heat transfer coefficient of the material of the first heat sink being larger than the case, the heat generated by the heating source can be transmitted sequentially through the thermal diffusing unit and the first heat sink to the air outside the case, thereby further improving the heat dissipation efficiency.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
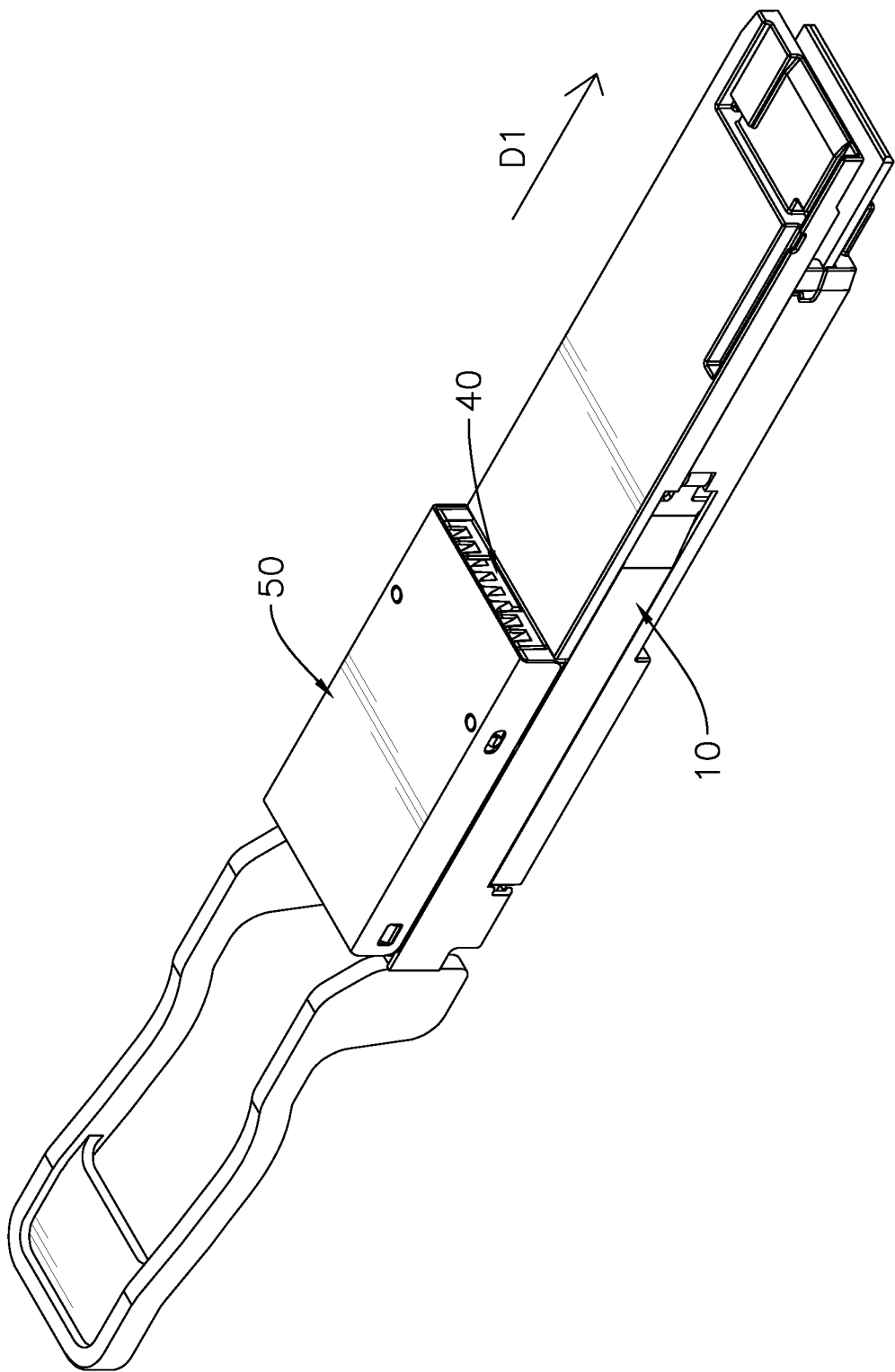
FIG. 1 is a perspective view of a cable end connector in accordance with the present invention.
Figure 2:
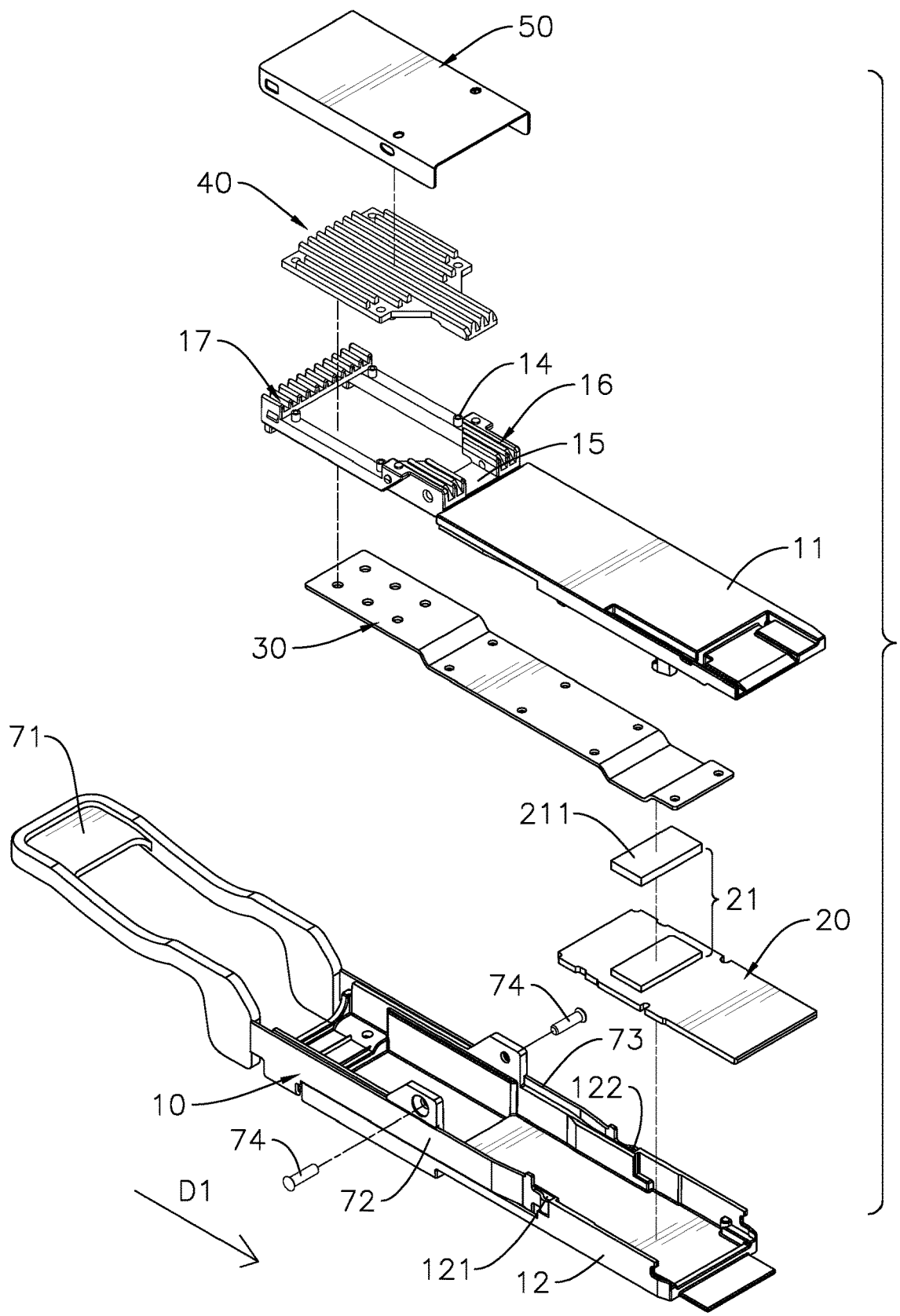
FIG. 2 is an exploded view of the cable end connector in FIG. 1.
Figure 3:
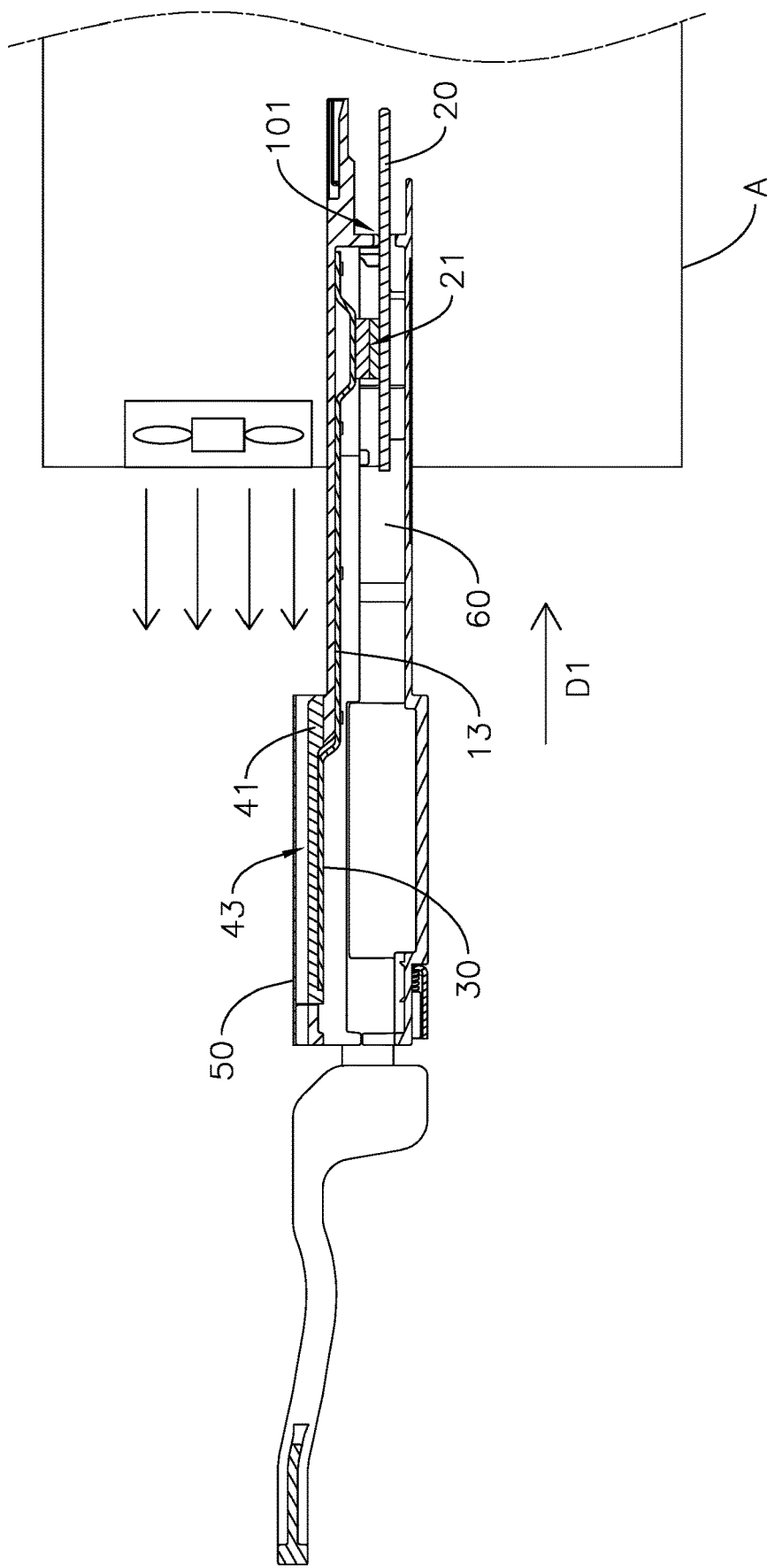
FIG. 3 is a side view in cross-section of the cable end connector in FIG. 1.

With reference to FIGS. 1, 2, and 3, a cable end connector in accordance with the present invention is adapted to be mounted in an electronic device A along an inserting direction D1. The cable end connector comprises a case 10, a circuit board 20, a thermal diffusing unit 30, and a first heat sink 40.

The case 10 can be formed by assembling an upper shell 11 and a lower shell 12. The case 10 has an inner surface 13.

The upper shell 11 is secured with the lower shell 12 and forms an accommodating space 60 therebetween.

The circuit board 20 is mounted in the case 10. In this embodiment, the inner surface 13 is formed on the upper shell 11, and the circuit board 20 is mounted on the lower shell 12. The circuit board 20 has a heating source 21. Specifically, the heating source 21 can be any electric unit such as an optical module or an IC, and the heating source 21 can comprise a thermal conductive sheet 211 or a thermal paste. At least a part of the circuit board 20 is disposed in the accommodating space 60 and at least a portion of the circuit board 20 is disposed outside of the accommodating space 60.

The thermal diffusing unit 30 is disposed in the accommodating space 60, is not exposed from the upper shell 11, and is thermally connected to the heating source 21 and the upper shell 11. The thermal diffusing unit 30 extends along the inserting direction D1. The thermal diffusing unit 30 abuts the inner surface 13 of the case 10 and the heating source 21 of the circuit board 20. Specifically, in an embodiment wherein the heating source 21 has a thermal conductive sheet 211 or a thermal paste, the thermal diffusing unit 30 abuts the thermal conductive sheet 211 or the thermal paste of the heating source 21, but in an embodiment wherein the heating source 21 does not have a thermal conductive sheet 211 or a thermal paste, the thermal diffusing unit 30 directly abuts the optical module or the IC.

An area of the thermal diffusing unit 30 abutting the inner surface 13 is, but not limited to, bigger than an area of the thermal diffusing unit 30 abutting the heating source 21. A heat transfer coefficient of the thermal diffusing unit 30 is larger than a heat transfer coefficient of the case 10. That is, the heat transfer coefficient of a material of the thermal diffusing unit 30 makes the heat generated by the heating source 21 transmitted quickly and evenly to the thermal diffusing unit 30, and to the whole surface of the thermal diffusing unit 30. Therefore, further with the area of the thermal diffusing unit 30 abutting the inner surface 13 being bigger than the area of the thermal diffusing unit 30 abutting the heating source 21, the heat conducting area can be enlarged.

Besides, the thermal diffusing unit 30 is, but not limited to, a sheet having multiple step structures.

Figure 4:
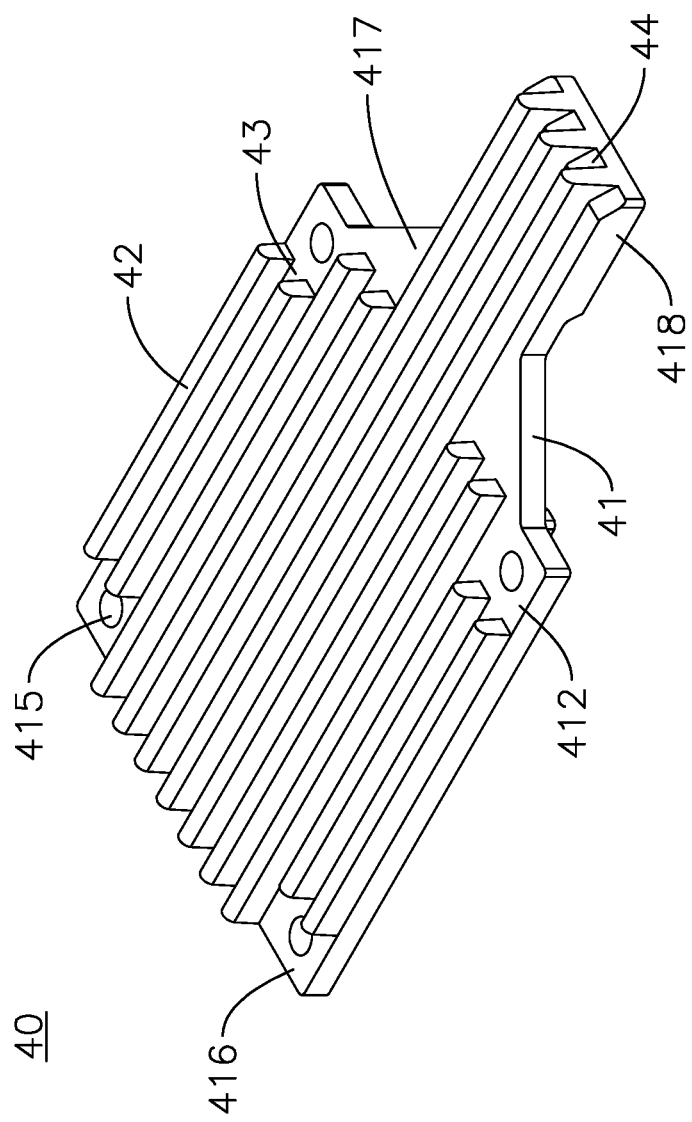
FIG. 4 is a perspective view of the cable end connector in FIG. 1, showing the first heat sink.
Figure 6:
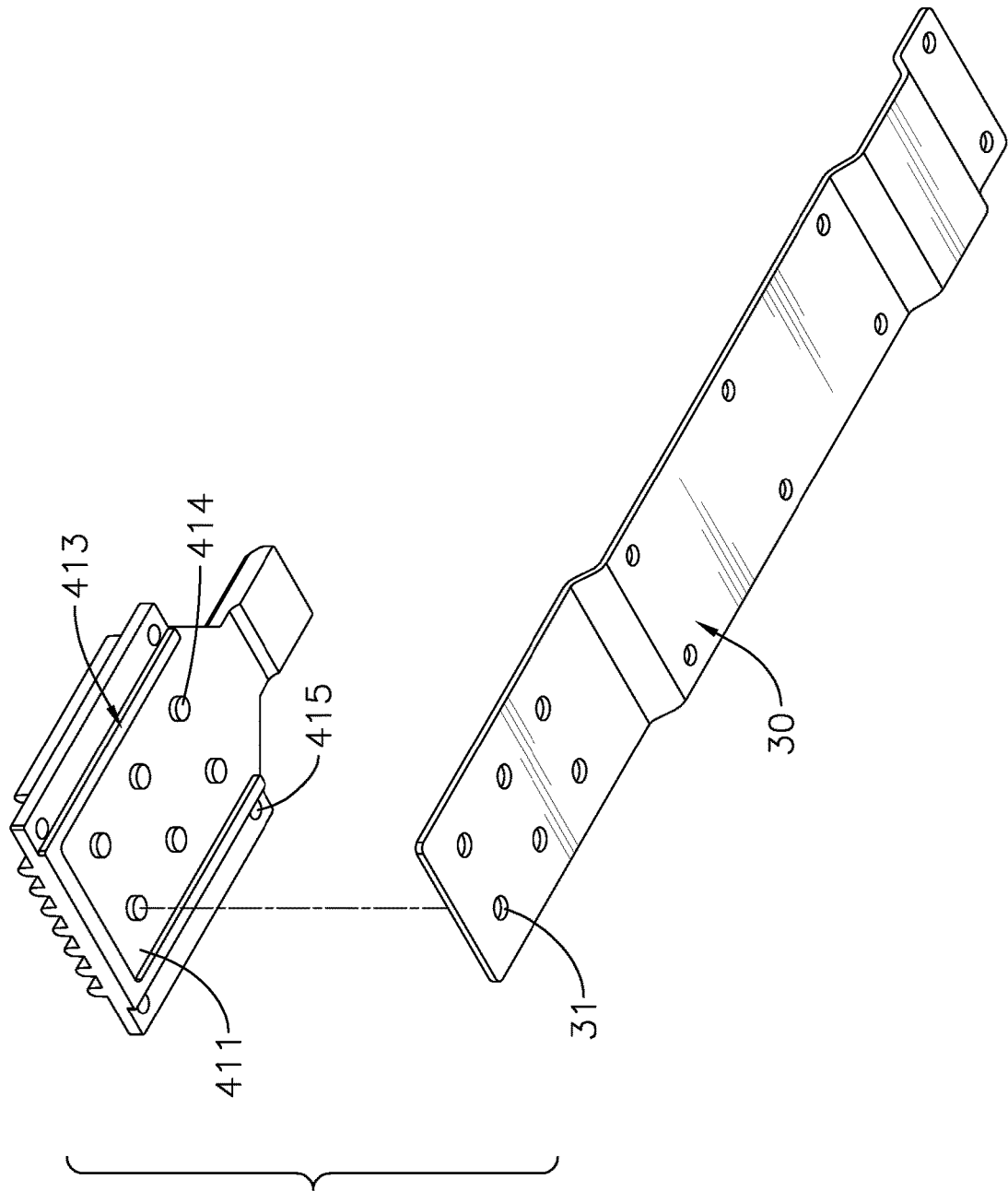
FIG. 6 is an exploded view of the cable end connector in FIG. 1, showing the first heat sink and the thermal diffusing unit.
Figure 7:
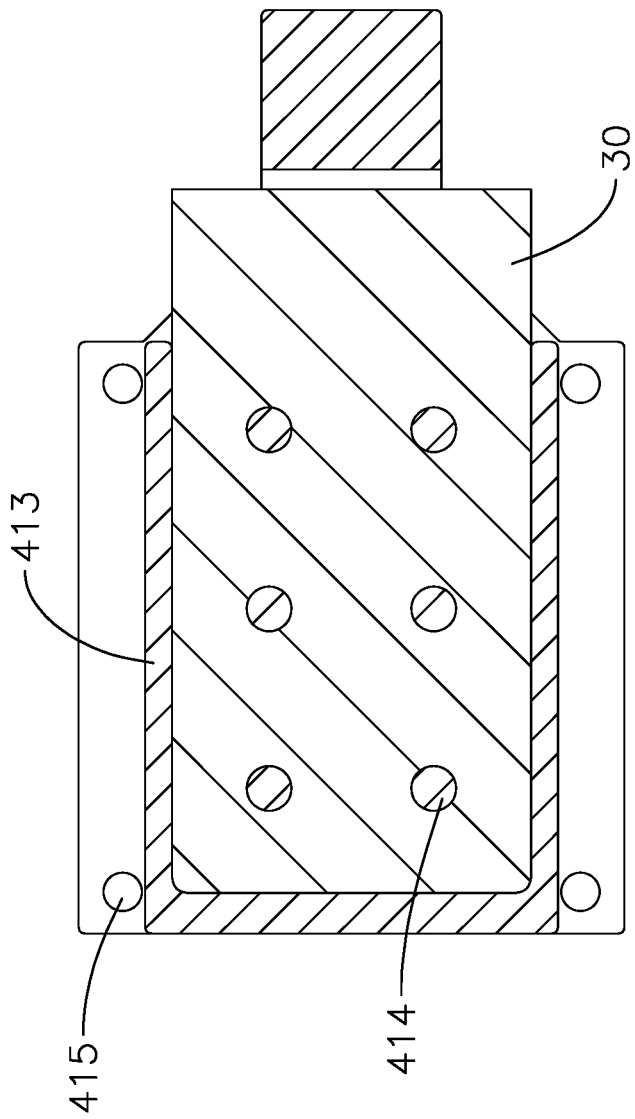
FIG. 7 is a bottom view in cross-section of the cable end connector in FIG. 1, showing the first heat sink and the thermal diffusing unit.
Figure 8:
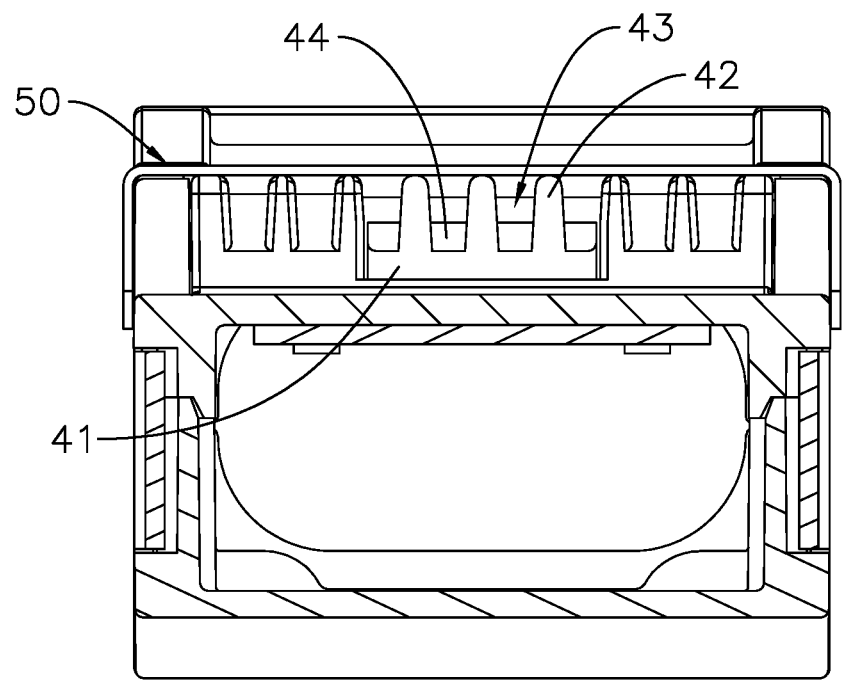
FIG. 8 is a front view in cross-section of the cable end connector in FIG. 1.
Figure 9:
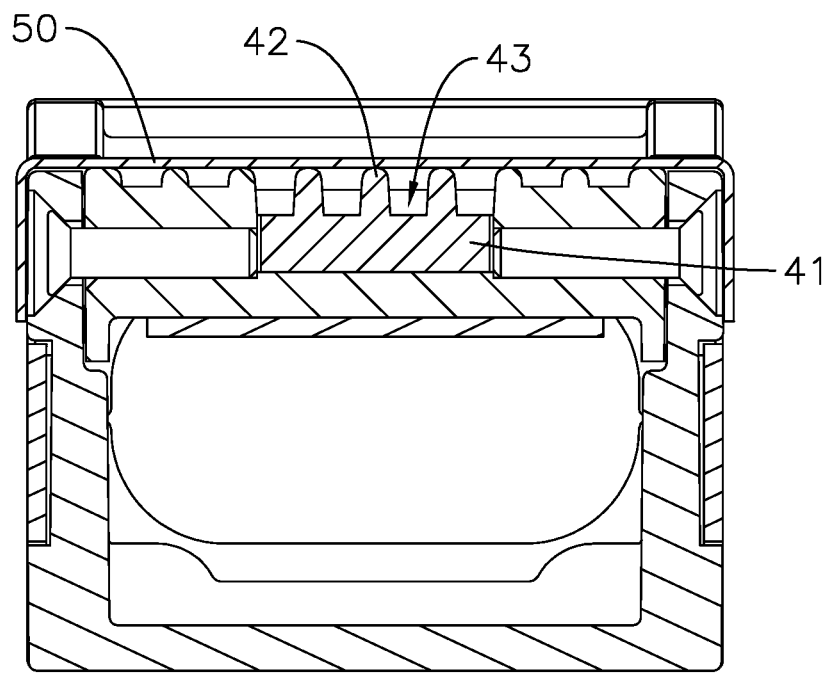
FIG. 9 is another front view in cross-section of the cable end connector in FIG. 1.

With further reference to FIGS. 2, 4, and 6, the first heat sink 40 abuts the thermal diffusing unit 30 and is exposed from the case 10. The first heat sink 40 is thermally coupled with the upper shell 11 and the thermal diffusing unit 30. In this embodiment, an area of the thermal diffusing unit 30 abutting the first heat sink 40 is, but not limited to, bigger than an area of the thermal diffusing unit 30 abutting the heating source 21. A heat transfer coefficient of the first heat sink 40 is larger than the heat transfer coefficient of the case 10, that is, the heat transfer coefficient of a material of the first heat sink 40 makes the heat generated by the heating source 21 quickly transmitted to the whole first heat sink 40.

The heating source 21 and the first heat sink 40 are thermally coupled via a first heat transmitting path and a second heat transmitting path. The first heat transmitting path comprises multiple nodes of the thermal diffusing unit 30 and the upper shell 11. The second heat transmitting path comprises a node of the thermal diffusing unit 30 and does not comprise any node of the upper shell 11. At least a portion of the first heat sink 40 is disposed at a rear portion of the cable end connector. The heating source 21 is disposed at a front portion of the cable end connector. In this embodiment, the first heat sink 40 and the case 10 are two independent components assembled with each other, but not limited thereto in other embodiments.

The first heat sink 40 has a base board 41, multiple first heat fins 42, and multiple first cooling wind passages 43. The base board 41 has a first surface 411 and a second surface 412 being opposite to each other. The first surface 411 abuts the thermal diffusing unit 30. The first heat fins 42 are thermally coupled with the case 10, are formed on the second surface 412 of the base board 41, and extend toward a direction away from the base board 41. The first heat fins 42 are spaced apart from each other and are parallel to each other. The first cooling wind passages 43 are respectively formed between the first heat fins 42. Each of the first cooling wind passages 43 is formed between two adjacent ones of the first heat fins 42. Specifically, in this embodiment, each of the first cooling wind passages 43 extends straightly, but in other embodiments each of the first cooling wind passages 43 can also be curved.

Besides, in this embodiment, each of the first cooling wind passages 43 is parallel to the inserting direction D1 so that a fan inside the electronic device A can cool down the first heat sink 40 more effectively. But in other embodiments, each of the first cooling wind passages 43 can also be inclined to the inserting direction D1, as long as an opening of each of the first cooling wind passages 43 faces toward the inserting direction D1.

With further reference to FIGS. 2 and 5 to 7, in this embodiment, the base board 41 of the first heat sink 40 further has an assembling surrounding wall 413, multiple assembling pins 414, and multiple fixing holes 415. The thermal diffusing unit 30 further has multiple assembling holes 31. The case 10 further has multiple fixing pillars 14. The assembling surrounding wall 413 of the base board 41 of the first heat sink 40 is formed on the first surface 411 of the base board 41, and surrounds the edge of the thermal diffusing unit 30. The assembling pins 414 of the base board 41 of the first heat sink 40 are formed on the first surface 411 of the base board 41, and are respectively mounted in the assembling holes 31 of the thermal diffusing unit 30. The fixing pillars 14 of the case 10 are respectively mounted in the fixing holes 415 of the base board 41 of the first heat sink 40. By this, the first heat sink 40, the case 10, and the thermal diffusing unit 30 can be assembled firmly without other components. But the assembling structure between the first heat sink 40, the case 10, and the thermal diffusing unit 30 is not limited to the abovementioned, as the first heat sink 40, the case 10, and the thermal diffusing unit 30 can also be bonded or welded together.

With further reference to FIGS. 2, 4, 8, and 9, in this embodiment, the connector further has a heat sink cover 50, and the first heat sink 40 further has multiple windward slopes 44. The heat sink cover 50 is mounted on the case 10 and covers the first heat sink 40. The first cooling wind passages 43 are formed between the heat sink cover 50 and the base board 41. The windward slopes 44 are formed on a front side, which is in the front in the inserting direction D1, of the base board 41. The windward slopes are respectively located between the first heat fins 42. Each of the windward slopes 44 is located between two adjacent ones of the first heat fins 42 and facing toward the inserting direction D1. Specifically, each of the windward slopes 44 has a first edge and a second edge being opposite to each other. The second edge is connected to the second surface 412 of the base board 41. In the inserting direction D1, the first edge is located in front of the second edge. In other words, a normal of each of the windward slopes 44 extends toward the inserting direction D1 and is inclined to the heat sink cover 50. As a result, a cross-sectional area of an opening, which faces the inserting direction D1, of each of the first cooling wind passages 43 is bigger than a cross-sectional area of each of the first cooling wind passages 43, so the windward slopes 44 cooperate with the heat sink cover 50 to increase the wind speed, thereby improving the heat dissipation efficiency.

But in another embodiment, the connector can also be implemented without the heat sink cover 50, without the windward slopes 44, or without both the heat sink cover 50 and the windward slopes 44. Besides, in this embodiment, an edge, which is away from the base board 41, of each of the first heat fins 42 abuts, but not limited to, the heat sink cover 50 such that the first cooling wind passages 43 are independent from each other.

Figure 5:
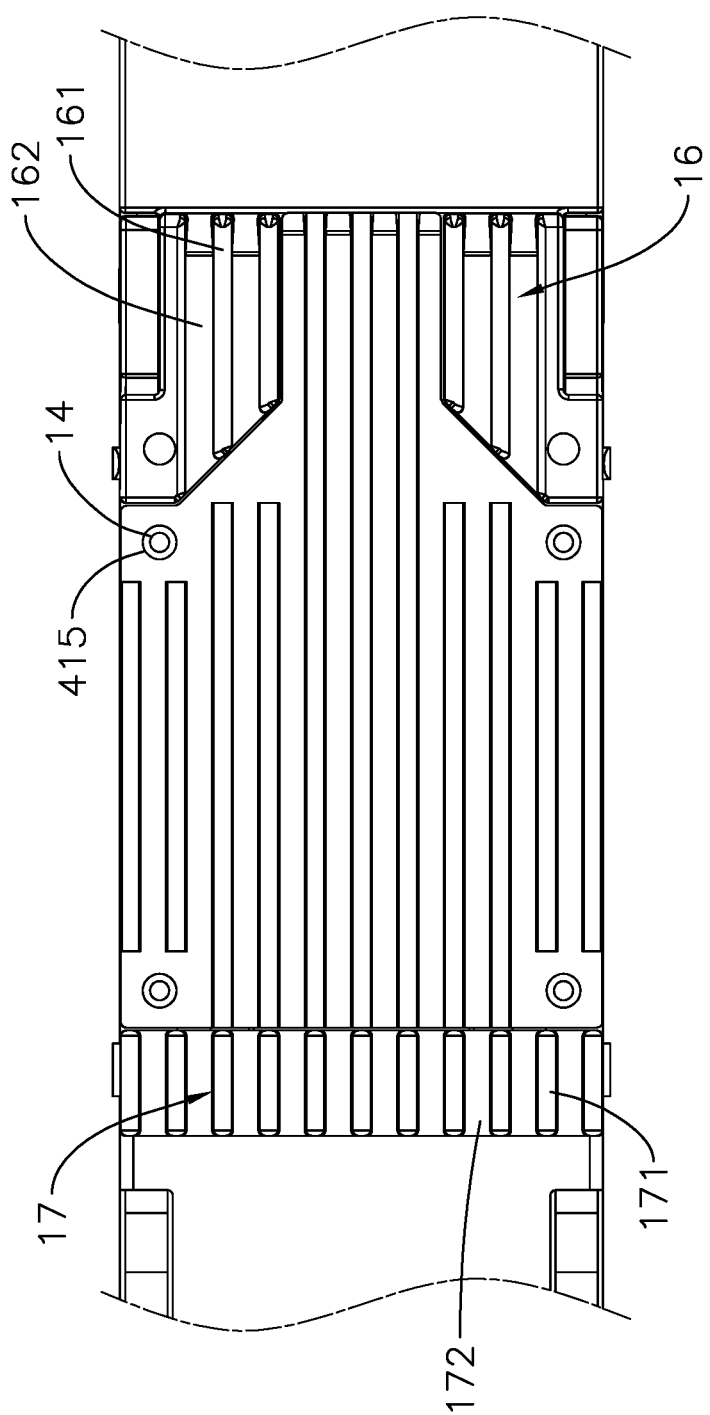
FIG. 5 is a top enlarged view of the cable end connector in FIG. 1, showing the first heat sink and the case.

With further reference to FIGS. 2, 4, and 5, in this embodiment, the case 10 further has an outer surface 15, a second heat sink 16, and a third heat sink 17.

The outer surface 15 is opposite to the inner surface 13. The second heat sink 16 is formed on the outer surface 15 of the case 10, is adjacent to the first heat sink 40, and has multiple second heat fins 161 and multiple second cooling wind passages 162. The second heat fins 161 are parallel to the first heat fins 42. The second cooling wind passages 162 are respectively formed between the second heat fins 161. Each of the second cooling wind passages 162 is formed between two adjacent ones of the second heat fins 161, and communicates with one of the first cooling wind passages 43. Preferably, the second cooling wind passages 162 each respectively communicate with the first cooling wind passages 43.

The third heat sink 17 is formed on the outer surface 15 of the case 10 and is adjacent to the first heat sink 40. The third heat sink 17 is located in front of the first heat sink 40 in the inserting direction D1, and the second heat sink 16 is located on a side opposite to the third heat sink 17. The third heat sink 17 has multiple third heat fins 171 and multiple third cooling wind passages 172. The third heat fins 171 are parallel to the first heat fins 42. The third cooling wind passages 172 are respectively formed between the third heat fins 171. Each of the third cooling wind passages 172 is formed between two adjacent ones of the third heat fins 171 and communicates with one of the first cooling wind passages 172. Preferably, the third cooling wind passages 172 each respectively communicate with the first cooling wind passages 43.

The structure of the case 10 is not limited to the above-mentioned, as the case 10 can also be implemented without the second heat sink 16, without the third heat sink 17, or without both the second heat sink 16 and the third heat sink 17.

In addition, in this embodiment, the base board 41 of the first heat sink 40 further has a main segment 416, an extending segment 417, and a tapered segment 418. The main segment 416 is connected to the thermal diffusing unit 30, and the first heat fins 42 are formed on the main segment 416. The extending segment 417 is connected to the main segment 416 and protrudes toward the inserting direction D1. A width of the extending segment 417 is smaller than a width of the main segment 416. At least one of the first heat fins 42 extends to the extending segment 417, and the windward slopes 44 are formed on a front side of the extending segment 417. The second heat fins 161 are respectively located on two sides of the extending segment 417 in the inserting direction D1. In the inserting direction D1, front ends of the second heat fins are flush with a front end of the extending segment 417. The tapered segment 418 is connected between the main segment 416 and extending segment 417, and a width of the tapered segment 418 gradually decreases along the inserting direction D1. But in other embodiments, the base board 41 of the first heat sink 40 can also be implemented without the extending segment 417 and the tapered segment 418. In this case, the second heat sink 16 can be located in front of the first heat sink 40 in the inserting direction D1.

In this embodiment, the cable end connector has a handle 71, a first arm 72, a second arm 73, and at least two fixing elements 74. The first arm 72 extends from the handle 71 toward the inserting direction D1 and is embedded in a first groove 121 formed on a first lateral surface of the lower shell 12. The second arm 73 extends from the handle 71 toward the inserting direction D1, is parallel to the first arm 72, and is embedded in a second groove 122 formed on a second lateral surface of the lower shell 12. The at least two fixing elements 74 secure the upper shell 11 with the lower shell 12. The case 10 has a front opening 101 for allowing the circuit board 20 to be penetrated therethrough.

With the heat transfer coefficient of the material of the thermal diffusing unit 30 being larger than the case 10, the thermal diffusing unit 30 abutting both the inner surface 13 of the case 10 and the heating source 21 of the circuit board 20, and the area of the thermal diffusing unit 30 abutting the inner surface 13 being larger than the area of the thermal diffusing unit 30 abutting the heating source 21, the thermal diffusing unit 30 is allowed to transmit heat from a small area to a big area, thereby enlarging the heat conducting area of the heating source 21 and improving the heat dissipation efficiency.

In addition, with the first heat sink 40 abutting the thermal diffusing unit 30 and exposed from the case 10, and the heat transfer coefficient of the material of the first heat sink 40 larger than that of the case 10, the heat generated by the heating source 21 can be transmitted sequentially through the thermal diffusing unit 30 and the first heat sink 40 to the air outside the case 10, thereby further improving the heat dissipation efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cable end connector comprising:
 a case having an upper shell and a lower shell; the upper shell secured with the lower shell and forming an accommodating space therebetween;
 a heat fin set, connected on a top surface of the upper shell, the heat fin set being located at a rear portion of the cable end connector;
 a circuit board having a heating source, the heating source being located at a front portion of the cable end connector; at least a part of the circuit board disposed in the accommodating space and at least a portion of the circuit board disposed outside of the accommodating space; and
 a thermal diffusing unit disposed in the accommodating space the thermal diffusing unit being strip-shaped and extending longitudinally from the heating source at the front portion toward the heat fin set, for transmitting heat from the heating source backward to both of the upper shell and the heat fin set;
a thermal conductive element, sandwiched between the heating source and the thermal diffusing unit for transmitting heat from the heating source to the thermal diffusing unit;
an area of the thermal diffusing unit thermally connected to the upper shell being bigger than an area of the thermal diffusing unit thermally connected to the heating source,
wherein, the thermal diffusing unit has a contacting portion abutting the thermal conductive element, and the contacting portion is spaced from and not in a direct contact with the upper shell.

2. The cable end connector as claimed in claim 1, wherein a heat transfer coefficient of the thermal diffusing unit is larger than a heat transfer coefficient of the upper shell.

3. The cable end connector as claimed in claim 1, wherein the cable end connector has
a handle;
a first arm extending from the handle toward an inserting direction and embedded in a first groove formed on a first lateral surface of the lower shell;
a second arm extending from the handle toward the inserting direction, parallel to the first arm, and embedded in a second groove formed on a second lateral surface of the lower shell; and
at least two fixing elements securing the upper shell with the lower shell;
the case has a front opening for allowing the circuit board to be penetrated therethrough.

4. The cable end connector as claimed in claim 2, wherein the cable end connector has
a handle;
a first arm extending from the handle toward an inserting direction and embedded in a first groove formed on a first lateral surface of the lower shell;
a second arm extending from the handle toward the inserting direction, parallel to the first arm, and embedded in a second groove formed on a second lateral surface of the lower shell; and
at least two fixing elements securing the upper shell with the lower shell;
the case has a front opening for allowing the circuit board to be penetrated therethrough.

5. The cable end connector as claimed in claim 1, wherein the thermal diffusing unit is a sheet having multiple step structures.

6. The cable end connector as claimed in claim 4, wherein the thermal diffusing unit is a sheet having multiple step structures.

7. The cable end connector as claimed in claim 1, wherein the cable heat fin set has
a heat sink thermally coupled with the upper shell and the thermal diffusing unit.

8. The cable end connector as claimed in claim 6, wherein the heat fin set has
a heat sink thermally coupled with the upper shell and the thermal diffusing unit.

9. The cable end connector as claimed in claim 7, wherein
the heating source and the heat sink are thermally coupled via a first heat transmitting path and a second heat transmitting path;
the first heat transmitting path comprises multiple nodes of the thermal diffusing unit and the upper shell; and
the second heat transmitting path comprises a node of the thermal diffusing unit and does not comprise any node of the upper shell.

10. The cable end connector as claimed in claim 8, wherein
the heating source and the heat sink are thermally coupled via a first heat transmitting path and a second heat transmitting path;
the first heat transmitting path comprises multiple nodes of the thermal diffusing unit and the upper shell; and
the second heat transmitting path comprises a node of the thermal diffusing unit and does not comprise any node of the upper shell.

11. The cable end connector as claimed in claim 7, wherein the heat sink has
multiple heat fins thermally coupled with the case, extending toward a direction away from the case, spaced apart from each other, and forming multiple cooling wind passages therebetween.

12. The cable end connector as claimed in claim 10, wherein the heat sink has
multiple heat fins thermally coupled with the case, extending toward a direction away from the case, spaced apart from each other, and forming multiple cooling wind passages therebetween.

13. The cable end connector as claimed in claim 7, wherein
at least a portion of the heat sink is disposed at the rear portion of the cable end connector.

14. The cable end connector as claimed in claim 2, wherein
at least a portion of the heat sink is disposed at the rear portion of the cable end connector.

15. The cable end connector as claimed in claim 1, wherein the thermal diffusing unit extends along an inserting direction.

16. The cable end connector as claimed in claim 7, wherein the heat sink and the case are two independent components assembled with each other.

17. The cable end connector as claimed in claim 1, wherein the thermal diffusing unit is not exposed from the upper shell.

* * * * *